(12) United States Patent  
Kobata et al.

(10) Patent No.: US 8,417,927 B2
(45) Date of Patent: Apr. 9, 2013

(54) APPARATUS FOR READING A FIRST PROGRAM, READING AND INITIALIZING A SECOND PROGRAM PRIOR TO POWER SAVING STATE AND EXECUTING THE SECOND PROGRAM UPON RETURNING TO ORDINARY STATE

(75) Inventors: Masahiro Kobata, Kanagawa (JP); Taketoshi Yamashita, Kanagawa (JP); Satoshi Ono, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 393 days.

(21) Appl. No.: 12/891,230

(22) Filed: Sep. 27, 2010

(65) Prior Publication Data

US 2011/0238968 A1 Sep. 29, 2011

(30) Foreign Application Priority Data

Mar. 26, 2010 (JP) ................................. 2010-071874

(51) Int. Cl.
*G06F 9/00* (2006.01)
*G06F 1/26* (2006.01)

(52) U.S. Cl.
USPC .............................................. 713/1; 713/320

(58) Field of Classification Search .............. 713/1, 320, 713/324, 340
See application file for complete search history.

(56) References Cited

U.S. PATENT DOCUMENTS

| 2006/0294357 A1 | 12/2006 | Choo |
| 2007/0214414 A1* | 9/2007 | Sohn .............................. 715/700 |
| 2009/0119540 A1 | 5/2009 | Weiberle et al. |
| 2010/0058045 A1* | 3/2010 | Borras et al. ....................... 713/2 |

FOREIGN PATENT DOCUMENTS

| JP | 2007213494 A | 8/2000 |
| JP | 2001341928 A | 12/2001 |
| JP | 2003044285 A | 2/2003 |
| JP | 2007257926 A | 10/2007 |
| JP | 2008518297 T | 5/2008 |
| JP | 2009501365 T | 1/2009 |

* cited by examiner

*Primary Examiner* — Thomas Lee
*Assistant Examiner* — Phil Nguyen
(74) *Attorney, Agent, or Firm* — Sughrue Mion, PLLC

(57) ABSTRACT

A function providing apparatus includes a first reading unit, a second reading unit, a first initializing unit, a second initializing unit, a first receiving unit, a second receiving unit, and a control unit. The first reading unit reads a first control program relating to a first function provided by a particular device. The second reading unit reads a second control program relating to a second function provided by data processing without using the particular device. The first initializing unit causes the processor to initialize the first control program. The second initializing unit causes the processor to initialize the second control program. The first receiving unit receives a first instruction. The second receiving unit receives a second instruction. The control unit establishes a power saving state in which power is supplied to the memory is continued, and makes a transition from the power saving state to the ordinary state.

7 Claims, 6 Drawing Sheets

APPARATUS FOR READING A FIRST PROGRAM, READING AND INITIALIZING A SECOND PROGRAM PRIOR TO POWER SAVING STATE AND EXECUTING THE SECOND PROGRAM UPON RETURNING TO ORDINARY STATE

CROSS-REFERENCE TO RELATED APPLICATIONS

This application is based upon and claims priority under 35 USC 119 from Japanese Patent Application No. 010-071874, filed Mar. 26, 2010.

BACKGROUND

1. Technical Field

The present invention relates to a function providing apparatus and a computer readable medium.

2. Related Art

In an apparatus (e.g., printer) which is configured by using a computer, an operating system (OS) is read from a hard disk drive (HDD) or the like into a memory and initialized by a processor upon power-on, whereby the function (e.g., printing function) of the apparatus is provided under the control of the OS.

SUMMARY OF THE INVENTION

According to an aspect of the invention, a function providing apparatus includes a first reading unit, a second reading unit, a first initializing unit, a second initializing unit, a first receiving unit, a second receiving unit, and a control unit. The first reading unit reads a first control program relating to a first function which is provided by using a particular device into a memory which serves as a work area of a processor. The second reading unit reads a second control program relating to a second function which is provided by data processing without using the particular device into the memory. The first initializing unit causes the processor to initialize the first control program stored in the memory. The second initializing unit causes the processor to initialize the second control program stored in the memory. The first receiving unit receives a first instruction to supply power to a given section that is used to operate the first reading unit, the second reading unit, and the second initializing unit. The second receiving unit receives a second instruction to make a transition to an ordinary state in which power is supplied to the function providing apparatus including the particular device. The control unit performs controls so as to cause the first reading unit to read the first control program and cause the second reading unit and the second initializing unit to read and initialize the second control program, respectively, in response to reception of the first instruction by the first receiving unit, then establish a power saving state in which supply of power to the memory is continued, and make a transition from the power saving state to the ordinary state to render the second function executable in response to reception of the second instruction by the second receiving unit in the power saving state.

BRIEF DESCRIPTION OF THE DRAWINGS

Exemplary embodiments of the invention will be described in detail based on the following figures, wherein.

DETAILED DESCRIPTION

An exemplary embodiment of the present invention will be hereinafter described with reference to the drawings.

Although a multifunction machine having multiple functions of scanning, printing, copying, etc. will be described below as an example function providing apparatus according to the exemplary embodiment of the invention, the invention is not limited to such a case.

Figure 1:
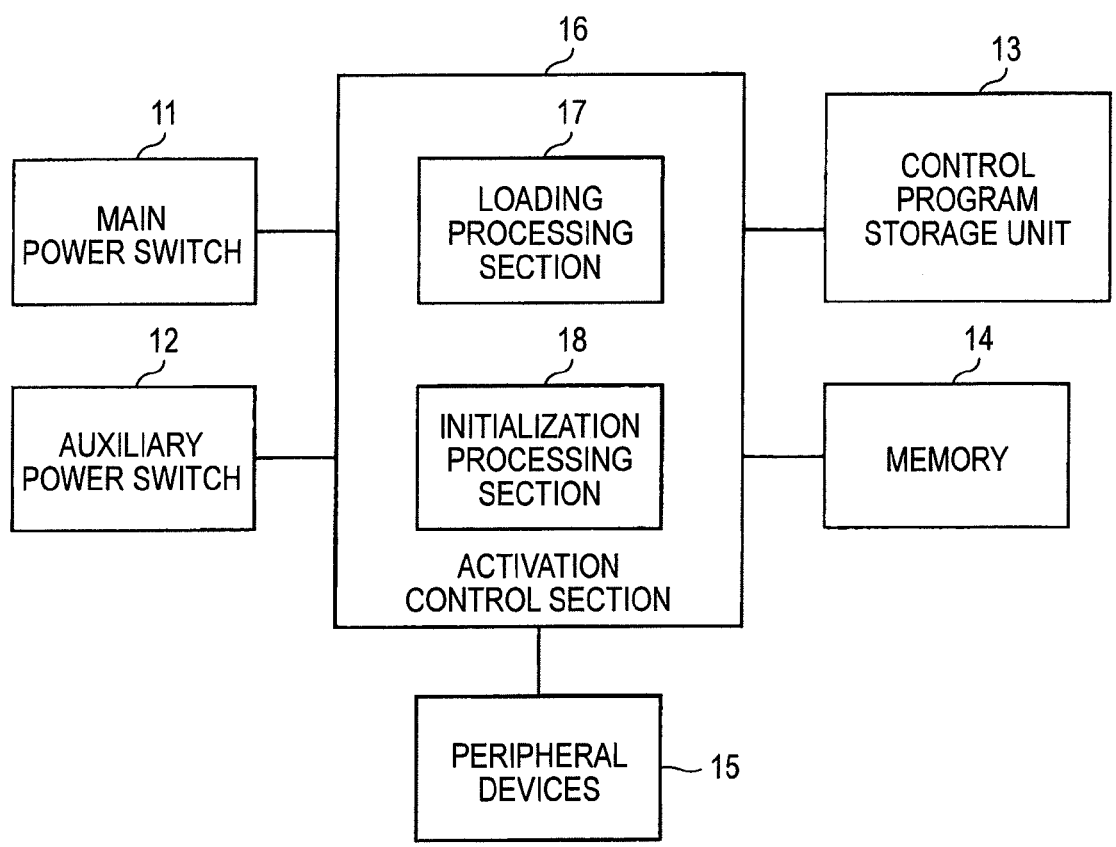
FIG. 1 is a functional block diagram of a function providing apparatus according to an exemplary embodiment of the present invention.

FIG. 1 is a functional block diagram of the function providing apparatus according to the exemplary embodiment of the invention. The function providing apparatus is equipped with a main power switch 11 and an auxiliary power switch 12 to be manipulated for switching the state of power supply to individual sections of the apparatus, an activation control section 16 for switching the state of power supply to the individual sections of the apparatus and performing a control so that activation processing is performed stepwise in response to switching of the main power switch 11 or the auxiliary power switch 12, and other sections.

The details of control of the activation control section 16 will be described below. In response to turning-on of the main power switch 11, the activation control section 13 supplies power to at least sections that are necessary for the activation processing of the apparatus and causes them to perform part of the activation processing. The activation control section 16 then makes a transition to a power saving state. In response to turning-on of the auxiliary power switch 12 in the power saving state, the activation control section 16 makes a transition to an ordinary state in which power is supplied to the entire apparatus.

As described above, in the function providing apparatus according to the exemplary embodiment, an instruction to supply power to at least the sections that are necessary for the activation processing of the apparatus is received by the main power switch 11. An instruction to make a transition to the ordinary state in which power is supplied to the entire apparatus is received by the auxiliary power switch 12. The activation processing is performed stepwise according to those instructions.

The activation processing is divided into loading processing of reading an OD (example control program) etc. from a control program storage unit 13 into a memory 14 which serves as a work area of a processor such as a CPU (central processing unit) and initialization processing in which the processor initializes the OS that has been read into the memory 14. A loading processing section 17 performs the loading processing and an initialization processing section 18 performs the initialization processing.

Although in the exemplary embodiment the control program storage unit 13 is an HDD, it may be another form of nonvolatile storage device such as a ROM (read-only memory) or an SD (registered trademark) card. Although in the exemplary embodiment the memory 14 is a DRAM (dynamic random access memory), it may be another form of volatile storage device.

The functions provided by the function providing apparatus according to the exemplary embodiment include not only functions that are provided by peripheral devices 15 such as a scanner (image reading device) and a printer (image forming device) but also functions that are provided through data processing on electronic data that is stored in a storage unit (e.g., confidential box; not shown) incorporated in the apparatus.

The former functions are functions each of which requires a particular device for its execution, such as a scanning function of storing, in the apparatus or an external storage unit, electronic data of a sheet surface image obtained by reading a paper medium with a scanner, a printing function of forming a print image on a paper medium with a printer on the basis of electronic data received from an external terminal together with a print instruction and outputting the paper medium, and a copying function of forming, on another paper medium, with the printer, a sheet surface image obtained by reading a paper medium with the scanner and outputting the paper medium.

The latter functions are functions each of which does not require a particular device for its execution, such as a file transfer function of transferring, to a specified address, an electronic file (a unit of handling of electronized information such as electronic data of a sheet surface image obtained by the scanning function in advance) stored in a storage unit (e.g., confidential box) incorporated in the apparatus, a file format conversion function of converting the format of an electronic file (e.g., into the JPEG format or the PDF format), and a file combining function of combining plural electronic files into a single electronic file.

Having two OSs, the function providing apparatus according to the exemplary embodiment causes the former functions (i.e., the functions that require particular devices) and the latter functions (i.e., the functions that do not require particular devices) to operate on the different OSs. In the following the OS as an execution environment of the former functions will be referred to as OS1 and the OS as an execution environment of the latter functions will be referred to as OS2. Although in the exemplary embodiment one OS1 and one OS2 are provided, plural OS1's and plural OS2's may be provided.

The OS2 used in the exemplary embodiment has a menu function for calling not only a function that operates on the OS2 but also a function that operates on the OS1. This menu function makes it possible to call a function corresponding to a user instruction received through the menu picture being displayed on a display device such as a liquid crystal panel. Therefore, to enable execution of a function that operates on the OS1, it is necessary that the initialization processing for the OS2 be completed and the menu function be in operation.

A description will now be made of the activation processing of the function providing apparatus according to the exemplary embodiment.

In the function providing apparatus according to the exemplary embodiment, the following operations are performed under the control of the activation control section 16 in response switching of the main power switch 11 and the auxiliary power switch 12.

When the main power switch 11 is turned on, the supply of part (e.g., 5 V) of voltages is started and power is supplied to at least sections that are necessary for execution of the activation processing (loading processing and initialization processing) of the apparatus. Examples of such sections are the CPU, boot ROM, DRAM, HDD, Ethernet (registered trademark) device, and SD card device. They are energized upon turning-on of the main power switch 11. In the exemplary embodiment, whether an SD card is inserted or not is detected. And an exclusive control is performed for power-on of the nonvolatile memories. For example, if an SD card is inserted, the SD card device is powered on but the HDD is not. If no SD card is inserted, the HDD is powered on but the SD card device is not.

Then, the loading processing section 17 reads the OS1 and the OS2 from the control program storage unit 13 into the memory 14, and the initialization processing section 18 causes the processor to initialize the OS2 that has been read into the memory 14. That is, the OS1 is subjected to up to loading processing but not subjected to initialization processing. On the other hand, not only loading processing but also initialization processing is performed for the OS2. Then, a halt state is established.

Upon completion of up to the OS2 initialization processing, a transition is made to a power saving state. And turning-on of the auxiliary power switch 12 is set as a condition (trigger) for recovery from the power saving state.

In the power saving state of the exemplary embodiment, only the memory 14 (DRAM) is energized, that is, continues to be supplied with power whereas no power is supplied to the other sections. Alternatively, part of the other sections may continue to be supplied with the same power or power that is lower than in the ordinary state. That is, the power saving state may be such that at least the memory 14 continues to be supplied with power and the supplied power is made lower than in the ordinary state in which the entire apparatus (including the peripheral devices 15) is supplied with power. In such a power saving state, the memory 14 being energized is self-refreshed and hence its storage contents (data of the OS1 which is in the loaded state and data of the OS2 which is in the loaded and initialized state) continue to be held.

When the auxiliary power switch 12 is turned on in the power saving state, a transition is made from the power saving state to the ordinary state, whereupon the entire apparatus (including the peripheral devices 15) comes to be supplied with power. And the OS2 is subjected to resume processing for recovering it from the suspended state, whereby a state that such functions as the file transfer, the file format conversion, and the file combining are executable is established quickly. On the other hand, the OS1 is subjected to initialization processing and, parallel with that, the peripheral devices 15 such as the scanner and the printer are subjected to initialization processing. As a result, a state that such functions as scanning, printing, and copying can be performed is established. In the exemplary embodiment, the OS1 is configured so as to inform the OS2 of completion of initialization of each function upon the completion so that the functions are rendered executable in order of completion of their initialization.

The initialization processing for the peripheral devices 15 can be of any of various types. For example, control programs for the respective peripheral devices 15 (or corresponding functions) may be run independently of the initialization processing for the OS1 or control programs for the respective peripheral devices 15 (or corresponding functions) may be run on the OS1 for which the initialization processing has completed.

In the function providing apparatus according to the exemplary embodiment, when part of the activation processing (loading processing for the OS1 and loading processing and initialization processing for the OS2) is performed in response to turning-on of the main power switch 11, a transition is made to the power saving state after execution of the part of the activation processing if the auxiliary power switch 12 is not turned on. On the other hand, if the auxiliary power switch 12 is turned on, the ordinary state is maintained (no transition is made to the power saving state) after execution of the part of the activation processing. Therefore, in a case that the auxiliary power switch 12 is turned on during execution of the part of the activation processing which was started in response to turning-on of the main power switch 11, such functions as the file transfer, the file format conversion, and the file combining are rendered executable soon after the execution of the part of the activation processing. Furthermore, the remaining part of the initialization processing (initialization processing for the OS1 and initialization processing for the peripheral devices 15) is executed immediately, whereby such functions as scanning, printing, and copying are also rendered executable.

Next, the time that is taken until the individual functions are rendered executable in the function providing apparatus according to the exemplary embodiment will be described in such a manner that it will be compared with the time taken in a conventional apparatus.

Figure 5:
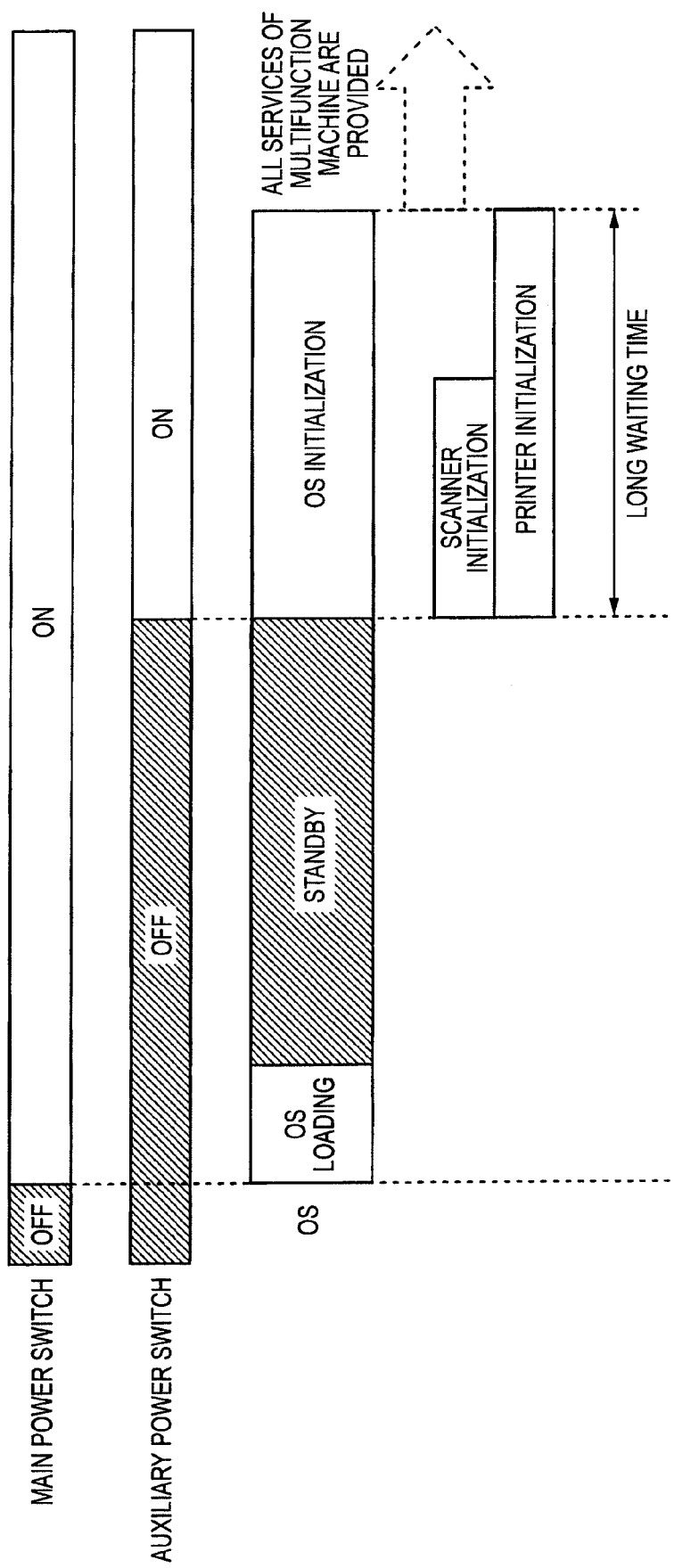
FIG. 5 illustrates example activation processing of a conventional function providing apparatus (single OS)

FIG. 5 illustrates example activation processing of a conventional function providing apparatus which is a multifunction machine having a single OS.

In this example, up to OS loading processing is performed in response to turning-on of a main power switch. Then, the apparatus stands by until turning-on of an auxiliary power switch. OS initialization processing is performed in response to turning-on of the auxiliary power switch and, parallel with that, initialization processing for peripheral devices such as a scanner and a printer is performed. Such functions (services) as scanning, printing, and copying are rendered executable only after completion of both of the OS initialization processing and the peripheral devices initialization processing. That is, when the user turns on the auxiliary power switch to use the function providing apparatus, a waiting time occurs that lasts until completion of all the pieces of initialization processing.

Figure 6:
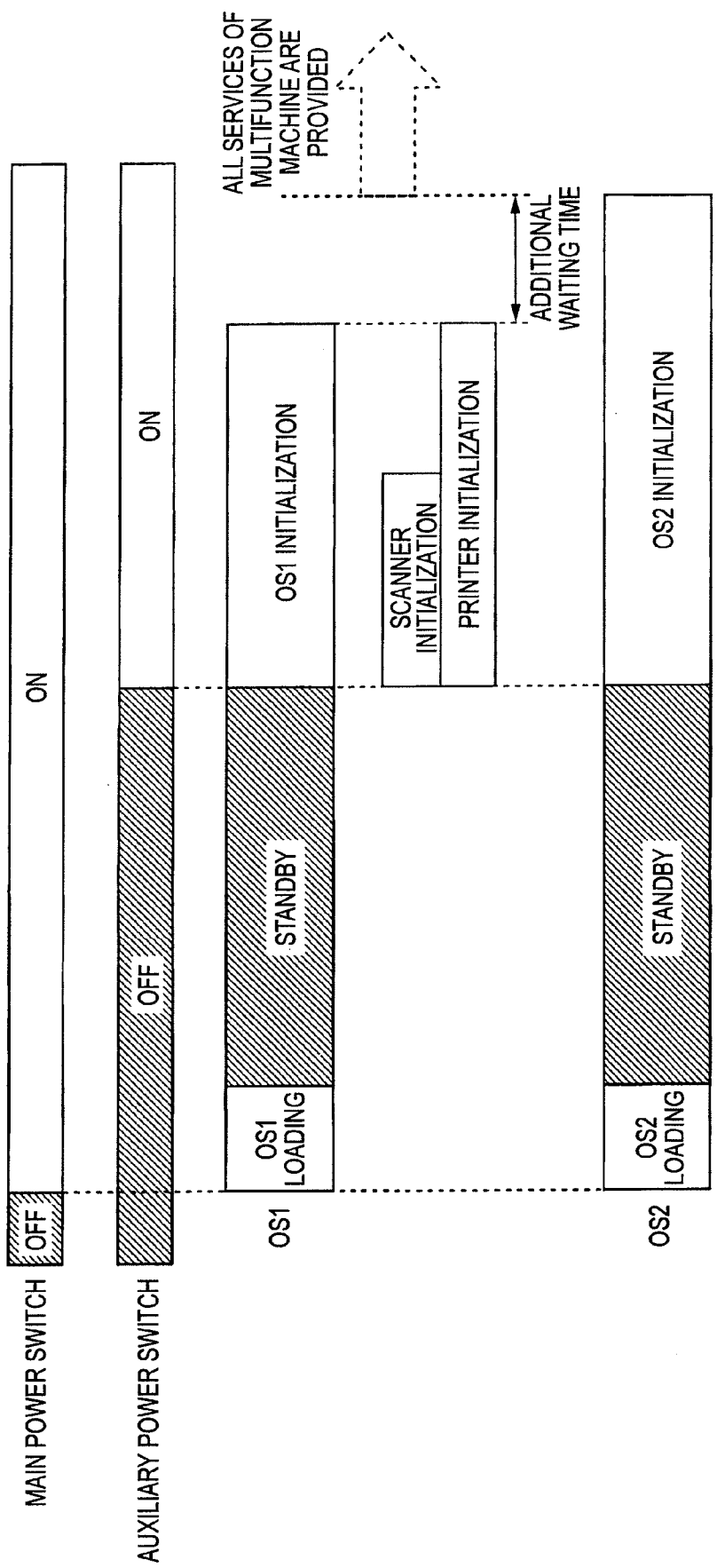
FIG. 6 illustrates example activation processing of another conventional function providing apparatus (multi-OS).

FIG. 6 illustrates example activation processing of another conventional function providing apparatus which is a multi-function machine having plural OSs (multi-OS). As in the case of the exemplary embodiment, it is assumed that an OS2 has a menu function for calling not only a function that operates on the OS2 but also a function that operates on an OS1, and that to enable execution of a function that operates on the OS1 it is necessary that initialization processing for the OS2 be completed and the menu function be in operation.

In this example, up to OS1 loading processing and OS2 loading processing are performed in response to turning-on of a main power switch. Then, the apparatus stands by until turning-on of an auxiliary power switch. OS1 initialization processing and OS2 initialization processing are performed in response to turning-on of the auxiliary power switch. Parallel with those pieces of initialization processing, initialization processing for peripheral devices such as a scanner and a printer is performed. Such functions (services) as scanning, printing, and copying are rendered executable only after completion of all of the OS1 initialization processing, OS2 initialization processing, and the peripheral devices initialization processing. That is, when the user turns on the auxiliary power switch to use the function providing apparatus, even if the OS1 initialization processing and the peripheral devices initialization processing have already completed, a function that operates on the OS1 cannot be called successfully until completion of the initialization of the OS2 on which the menu function for calling such a function operates. Therefore, a waiting time occurs that lasts until completion of all the pieces of initialization processing.

Figure 2:
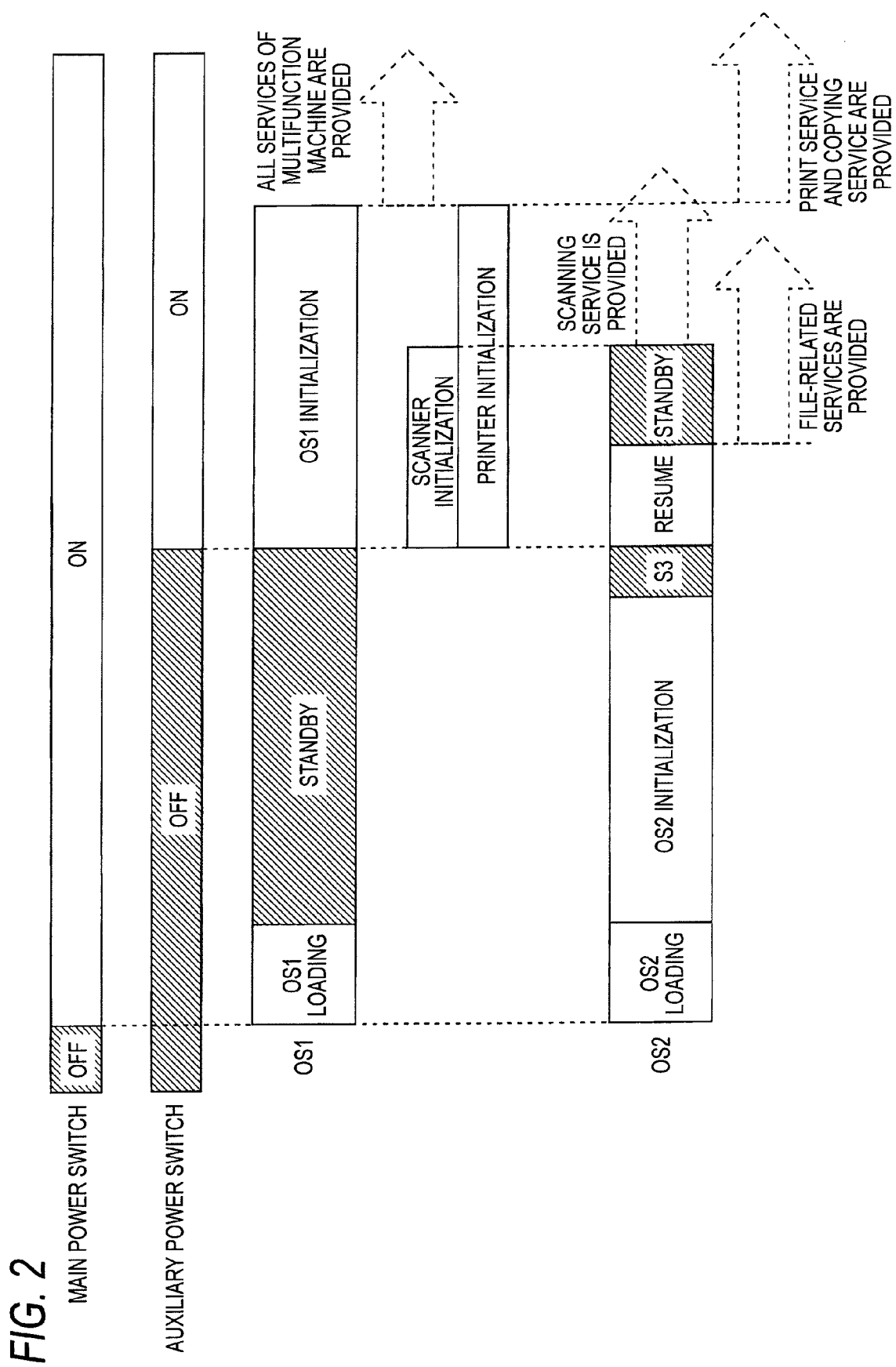
FIG. 2 illustrates example activation processing of the function providing apparatus according to the exemplary embodiment of the invention.

In contrast, in the function providing apparatus according to the exemplary embodiment, the activation processing is performed on the order shown in FIG. 2.

Up to OS1 loading processing, OS2 loading processing, and OS2 initialization processing are performed in response to turning-on of the main power switch 11. Then, the apparatus stands by (denoted by symbol S3 in FIG. 2) until turning-on of an auxiliary power switch. Resume processing is performed for the OS2 in response to turning-on of the auxiliary power switch 12, whereby a state that such functions as the file transfer, the file format conversion, and the file combining is established. On the other hand, OS1 initialization processing is performed and, parallel with that, initialization processing for the peripheral devices 15 such as the scanner and the printer is performed. Such functions as scanning, printing, and copying are sequentially rendered executable as the respective pieces of initialization processing for the peripheral devices 15 are completed.

Since the peripheral devices 15 (particular devices) such as the scanner and the printer are not used under the OS2, the OS2 initialization processing can be performed even in a state that the peripheral devices 15 are powered off (i.e., the auxiliary power switch 12 is off). Therefore, the OS2 initialization processing can be completed after turning-on of the main power switch 11 (irrespective of the state of the auxiliary power switch 12).

In the example of FIG. 2, a state that such functions (file services) as the filter transfer, the file format conversion, and the file combining are executable is established first. Then, a state that the scanning function which is provided by using the scanner is executable is established. Finally, a state that the printing function (printing service) and the copying function (copying service) which are provided by using the printer are also executable (i.e., a state that all the services can be provided) is established.

Figure 3:
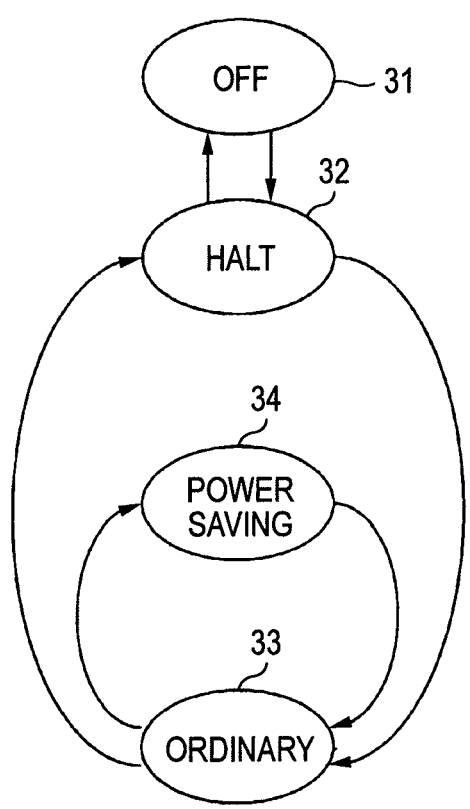
FIG. 3 shows an example state transition diagram of the function providing apparatus according to the exemplary embodiment of the invention.

FIG. 3 shows an example state transition diagram of the function providing apparatus according to the exemplary embodiment.

At the beginning, the function providing apparatus according to the exemplary embodiment is in an off state 31. When the main power switch 11 is turned on, a transition is made to an ordinary state 3 via a halt state 32. In the ordinary state, power is not supplied to the entire apparatus but to only the sections that are necessary for execution of its activation processing (loading processing and initialization processing). Up to OS1 loading processing, OS2 loading processing, and OS2 initialization processing are performed in this state. Then, a transition is automatically made to a power saving state 34 (except in the case where the auxiliary power switch 12 has already been turned on). When the auxiliary power switch 12 is turned on, a transition is made from the power saving state 34 to the ordinary state 33 and power is supplied to the entire apparatus. As soon as the functions to operate on the OS2 are rendered executable, OS1 initialization processing and initialization processing for the peripheral devices 15 are performed. Upon completion of those pieces of processing, the functions to operate on the OS1 are rendered executable.

Figure 4:
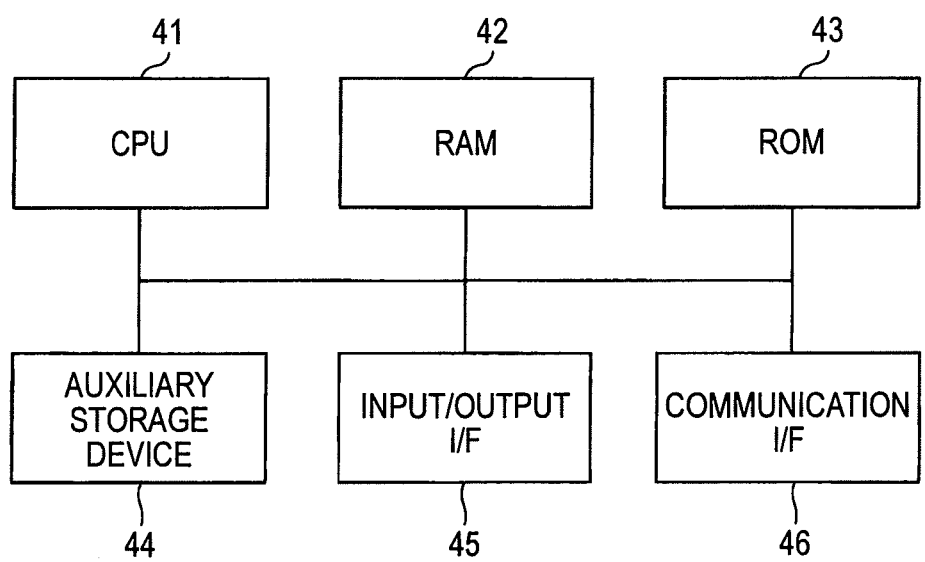
FIG. 4 shows an example configuration of main hardware of the function providing apparatus according to the exemplary embodiment of the invention.

FIG. 4 shows an example configuration of main hardware of a computer that operates as the function providing apparatus according to the exemplary embodiment.

In this example, the computer has such hardware resources as a CPU 41 which performs various kinds of computation, main storage devices such as a RAM 42 which serves as a work area of the CPU 41 and a ROM 43 which is stored with fundamental control programs, an auxiliary storage device 44 (e.g., a nonvolatile memory such as the magnetic disk of an HDD or the like, an SD card, or a flash memory) which is stored with a program according to the exemplary embodiment of the invention and various data, an input/output I/F 45 which is an interface with a display device for displaying various kinds of information and input devices such as manipulation buttons and a touch panel to be used for an input manipulation by an operator, and a communication I/F 46 which is an interface for performing a wired or wireless communication with another apparatus.

Programs according to the exemplary embodiment of the invention are read from the auxiliary storage device 44 or the like, developed in the RAM 42, and run by the CPU 41, whereby the function providing apparatus according to the exemplary embodiment of the invention is implemented on the computer.

For example, the programs according to the exemplary embodiment of the invention are set in the computer in such a manner that it is read from an external storage medium such as a CD-ROM or received over a communication line.

The invention is not limited to the case of the exemplary embodiment in which the function providing apparatus is implemented by software. An equivalent function providing apparatus may be implemented by using dedicated hardware modules.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

What is claimed is:

1. A function providing apparatus comprising:
    a first reading unit that reads a first control program relating to a first function which is provided by using a particular device into a memory which serves as a work area of a processor;
    a second reading unit that reads a second control program relating to a second function which is provided by data processing without using the particular device into the memory;
    a first initializing unit that causes the processor to initialize the first control program stored in the memory;
    a second initializing unit that causes the processor to initialize the second control program stored in the memory;
    a first receiving unit that receives a first instruction to supply power to a given section that is used to operate the first reading unit, the second reading unit, and the second initializing unit;
    a second receiving unit that receives a second instruction to make a transition to an ordinary state in which power is supplied to the function providing apparatus including the particular device; and
    a control unit that performs controls so as to cause the first reading unit to read the first control program and cause the second reading unit and the second initializing unit to read and initialize the second control program, respectively, in response to reception of the first instruction by the first receiving unit, then establish a power saving state in which supply of power to the memory is continued, and make a transition from the power saving state to the ordinary state to render the second function executable in response to reception of the second instruction by the second receiving unit in the power saving state.

2. The function providing apparatus according to claim 1, wherein the control unit performs a control so as to cause the first initializing unit to initialize the first control program to render the first function executable in response to the reception of the second instruction by the second receiving unit in the power saving state.

3. The function providing apparatus according to claim 2, wherein the first function include a plurality of third function, and
    the control unit performs controls so as to render the third functions executable in order of completion of initialization of the third functions.

4. The function providing apparatus according to claim 1, wherein the control unit establishes the power saving state when the second receiving unit does not receive the second instruction after executing the reading of the first control program and the reading and the initialization of the second control program in response to the reception of the first instruction by the first receiving unit,
    the control unit establishes the ordinary state instead of the power saving state and causes the first initializing unit to initialize the control program relating to the first function when the second receiving unit receives the second instruction after executing the reading of the first control program and the reading and the initialization of the second control program in response to the reception of the first instruction by the first receiving unit.

5. The function providing apparatus according to claim 2, wherein the control unit establishes the power saving state when the second receiving unit does not receive the second instruction after executing the reading of the first control program and the reading and the initialization of the second control program in response to the reception of the first instruction by the first receiving unit,
    the control unit establishes the ordinary state instead of the power saving state and causes the first initializing unit to initialize the control program relating to the first function when the second receiving unit receives the second instruction after executing the reading of the first control program and the reading and the initialization of the second control program in response to the reception of the first instruction by the first receiving unit.

6. The function providing apparatus according to claim 3, wherein the control unit establishes the power saving state when the second receiving unit does not receive the second instruction after executing the reading of the first control program and the reading and the initialization of the second control program in response to the reception of the first instruction by the first receiving unit,
    the control unit establishes the ordinary state instead of the power saving state and causes the first initializing unit to initialize the control program relating to the first function when the second receiving unit receives the second instruction after executing the reading of the first control program and the reading and the initialization of the second control program in response to the reception of the first instruction by the first receiving unit.

7. A computer readable medium storing a program causing a computer to execute a process for providing function, the process comprising:
    reading a first control program relating to a first function which is provided by using a particular device into a memory;

reading a second control program relating to a second function which is provided by data processing without using the particular device into the memory;

initializing the first control program;

initializing the second control program;

receiving a first instruction to supply power to a given section that is used to execute the first control program reading step, the second control program reading step, and the second control program initializing step;

receiving a second instruction to make a transition to an ordinary state in which power is supplied to an entire apparatus including the particular device; and a control unit that performs controls so as to execute the first control program reading step, the second control program reading step, and the second control program initializing step, respectively, in response to reception of the first instruction in the first instruction receiving step, then establish a power saving state in which supply of power to the memory is continued, and make a transition from the power saving state to the ordinary state to render the second function executable in response to reception of the second instruction in the second instruction receiving step in the power saving state.

* * * * *